United States Patent [19]

Langenbahn

[11] Patent Number: 5,033,408
[45] Date of Patent: Jul. 23, 1991

[54] PET BED HAVING A CUSHION WITH A QUICK CHANGEABLE COVER

[76] Inventor: Albert E. Langenbahn, 704 S. Morgan, Mason City, Ill. 62664

[21] Appl. No.: 444,261

[22] Filed: Dec. 1, 1989

[51] Int. Cl.⁵ .............................................. A01K 1/00
[52] U.S. Cl. .................................. 119/28.5; 5/420; 5/460
[58] Field of Search ............... 119/1; 5/401, 402, 411, 5/417, 420, 440, 460, 471; 446/482; 5/451

[56] References Cited

U.S. PATENT DOCUMENTS

| | | | |
|---|---|---|---|
| 211,705 | 1/1879 | Corduan | 5/451 |
| 1,774,191 | 8/1930 | Stannard | 5/402 |
| 2,292,540 | 8/1942 | Norton | 119/1 |
| 3,358,647 | 12/1957 | Wilson | 119/1 |
| 3,838,470 | 10/1974 | May | 5/460 |
| 4,190,916 | 3/1980 | McMullan | 5/401 |
| 4,364,134 | 12/1982 | Marks | 5/411 |
| 4,395,787 | 8/1983 | McMullan et al. | 5/451 |
| 4,712,260 | 12/1987 | Bissel | 5/451 |

FOREIGN PATENT DOCUMENTS

| | | | |
|---|---|---|---|
| 0653123 | 11/1937 | Fed. Rep. of Germany | 119/1 |
| 0852282 | 10/1952 | Fed. Rep. of Germany | 5/344 |
| 0728570 | 4/1955 | United Kingdom | 119/1 |
| 0955581 | 4/1964 | United Kingdom | 119/1 |

OTHER PUBLICATIONS

"A Bed for Your Dog", *Popular Mechanics*, Dec. 1943, p. 113.

*Primary Examiner*—Robert P. Swiatek
*Assistant Examiner*—Todd E. Manahan
*Attorney, Agent, or Firm*—Edwin E. Greigg; Ronald E. Greigg

[57] ABSTRACT

A pet bed which includes a covering for a cushion with the covering held in place by a surrounding framework. The covering could have a waterproof backing or a waterproof covering could be placed over the cushion between the covering and cushion to protect the cushion.

2 Claims, 2 Drawing Sheets

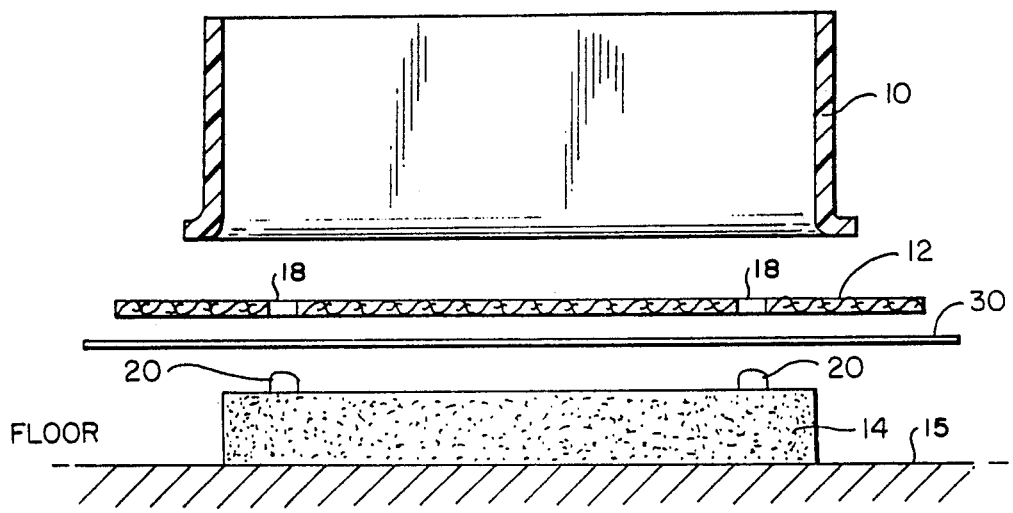
FIG. 4
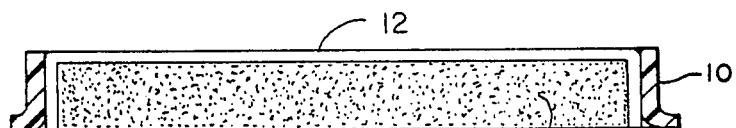
FIG. 7
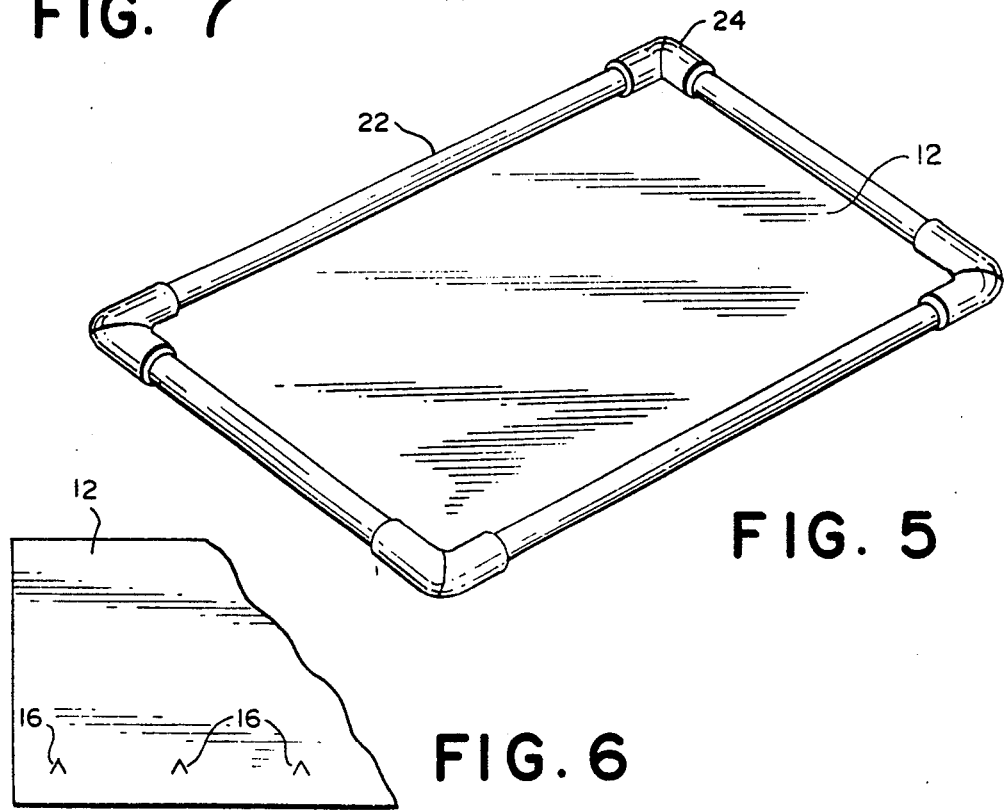
FIG. 5
FIG. 6

PET BED HAVING A CUSHION WITH A QUICK CHANGEABLE COVER

BACKGROUND OF THE INVENTION

This invention is directed to a pet bed and more particularly to a pet bed having a cushion with an overlying covering which is easily installed and easily removed for washing or disposal of the cover and replacement thereof.

Heretofore pet beds have been made of various shapes, different designs and of varying materials. Some such beds have been set forth in U.S. Pat. Nos. 2,032,248; 2,900,956; 2,980,058; 3,125,663 and 4,597,359. Patents related to similar structure for related use have been set forth in U.S. Pat. Nos. 3,416,495 and 4,522,150.

It is an object of this invention to provide a pet bed which includes a cushion with a covering which can be easily installed and removed for any purpose.

Another object is to provide a pet bed in which the framework or protective structure is used to secure the covering onto a cushion.

Still another object is to provide a quick changeable pet bed covering which includes indices thereon by which the covering may be properly placed onto a cushion for covering the cushion during use.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 4 is a cross-sectional view of a modification,

FIG. 5 is a perspective top view of a modified framework

FIG. 6 illustrates a portion of a covering having indices along one edge, and

FIG. 7 illustrates a pet bed in which the sides of the framework are substantially the same height as the thickness of the cushion.

DESCRIPTION OF THE PREFERRED EMBODIMENT

Figure 1:
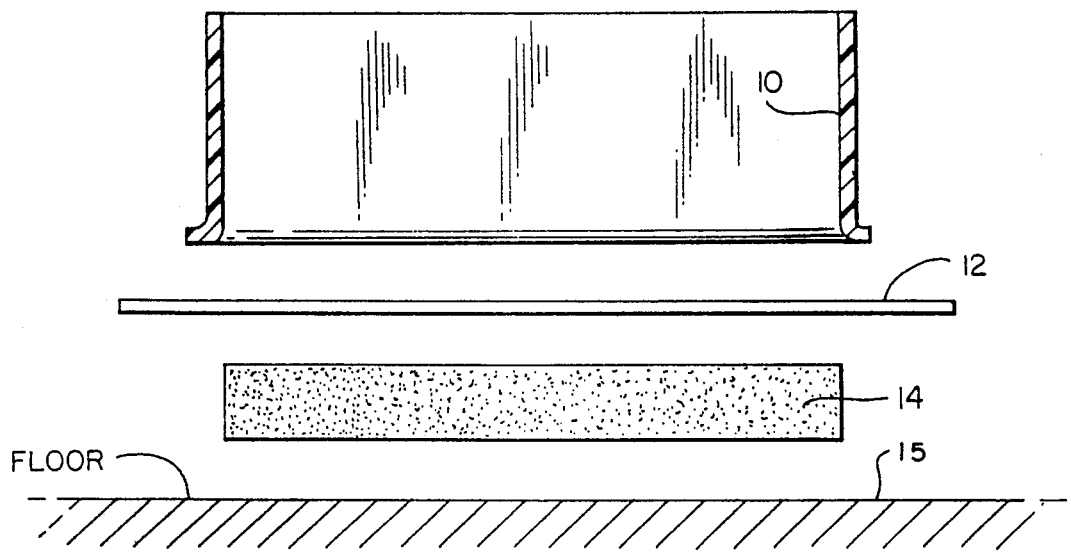
FIG. 1 is a cross-sectional exploded view.

Now referring to the drawings wherein like reference characters represent like parts throughout the drawing, there is shown in FIG. 1 an exploded view of a pet bed made in accordance with this invention. As shown, the pet bed includes a framework 10 which may be made of any desired material such as wood, plastic, metal, cardboard, wireframe, etc. The pet bed includes a covering 12 which may be made of any desired material such as any type of cloth, knitted material, or crocheted material. Any of the above materials may be made with a waterproof backing to prevent soiling of a cushion 14 which is placed beneath the covering 12. The frame and cushion may rest on the floor or any other desired place for comfort of the pet. A separate plastic sheet or other waterproofing material may be placed onto the cushion 14 and then the covering 12 placed over the waterproof sheet, if desired. Obviously, the covering 12 could be applied over the cushion without any protective sheet between the covering and the cushion. The cushioning is supported on a support 15 such as the floor.

Figure 2:
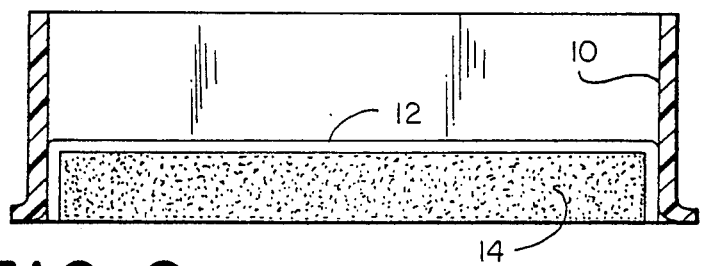
FIG. 2 is a cross-sectional view of the pet bed with covering and framework in place.

FIG. 2 illustrates a cross sectional view of the pet bed assembled for use. As shown, the covering 12 is placed over the cushion 10 with indices 16 of the covering at the corners of the cushion so that the indices of the covering will be at the corners of the cushion. In this position, the covering is equally spaced relative to the edges of the cushion so that equal amounts of the edging hangs over the edges of the cushion. Once the covering is in place, the framework is pushed downward over the cushion so that there is a tight fit between the framework and the covering. Obviously the framework will have approximately the same inner dimensions as the outer dimensions of the cushion so that there will be a tight fit of the covering. The covering should extend over the edges of the cushion an amount which is approximately the thickness of the cushion.

Figure 3:
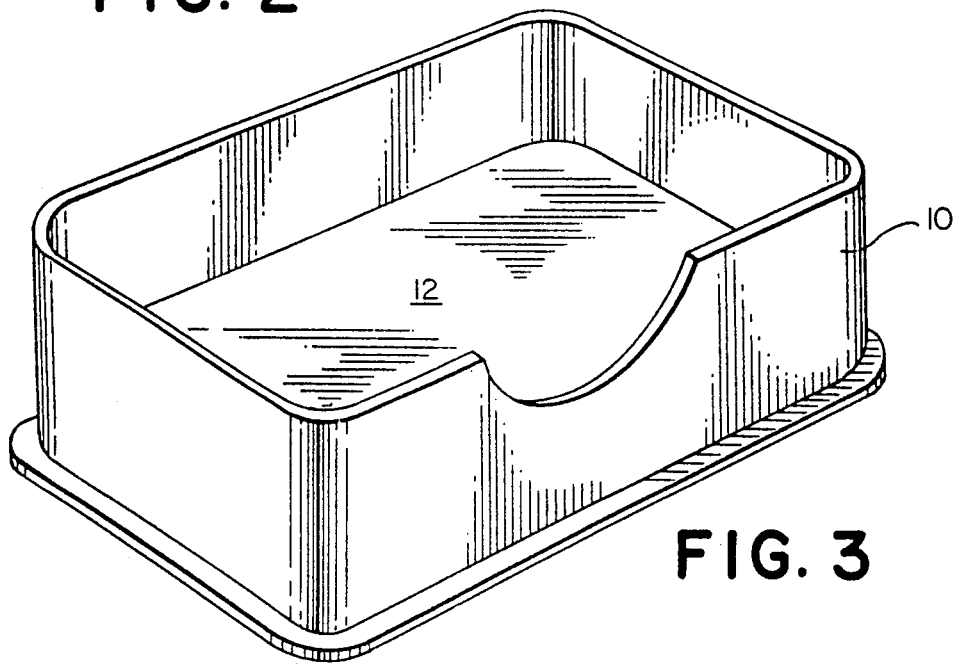
FIG. 3 is a perspective, top view illustrating the covering and framework.

FIG. 3 is a perspective view of the pet bed illustrating the framework with the covered bedding within the framework. The framework is shown with upstanding sides with a cutout front side for entry of the pet. The upstanding sides provides protection from air currents when the pet is in the pet bed.

The framework has been shown in FIG. 3 with upstanding sides with a cutout front side. It would be obvious from this invention that the framework could have sides no higher than the thickness of the cushion or any other desired height. The important part is that the framework have inner dimensions substantially that of the outer dimensions of the cushion so that the framework will hold the covering in place.

A pet bed such as set forth herein could be placed on the floor or any other surface for support of the cushion and framework. As shown in FIGS. 1 and 2, the bottom edges could be radiused to assist in slipping the framework over the covering.

Obviously the framework could be any color, to include pictures or any other art work without departing from the invention. The most important thing is that the framework include structure at the bottom of the sides and ends so that there will be supporting framework to hold the covering in place.

In removing the covering for washing or disposal, all that is necessary is that pressure be applied to one end or side of the covering while lifting the corresponding side of the framework. Holding the framework with one end spaced from the supporting structure and then pushing the raised end of the cushion downward would accomplish the same thing. Once the framework is removed from the covered cushion the covering can be easily lifted from the cushion.

FIG. 4 is a cross-sectional view which illustrates at least two upstanding pegs 20 at two corners of the cushion which fit into comparable holes 18 in the covering 12 in order to hold the covering in place during assembly of the pet bed. A protective sheet of plastic 30 is also shown.

FIG. 5 is a perspective view of a modified framework in which 24 which may be fitted together by any suitable means of glue or screws. The dimensions of the pipe lengths and elbows should be such that there will be a tight fit about the edges of the cushion with the covering thereon. As in the preferred device, the piping is slid over the covering which is held between the piping and the cushion.

Modification, the covering could be sufficiently larger than the cushion that the covering would not only be pressed between the cushion and the framework but that it would fit under the bottom edges of the sides and ends of the framework or cushion.

The pet bed has been shown as being rectangular. Obviously it could be made square, round, triangular, trapezoidal or any other shape without departing from the invention so long as the cushion has a matching shape with the outside dimensions of the cushion approximately equal to the inside dimensions of the framework.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pet bed which consists essentially of:

a cushion;
   a covering for said cushion, and
   a bottom less framework having a configuration of said cushion;
   said frame work having an inner perimeter dimension substantially the same as an outer perimeter dimension of said cushion whereby said framework makes a tight fitting engagement with said covering that covers said cushion when said covering is placed onto said cushion and said bottomless framework includes a portion which is radiused outwardly in order to assist in placing said framework over said covering and said cushion when said covering is placed onto said cushion.

2. A pet bed as set forth in claim 1 in which said cover includes means for preventing removal of said covering when said covering and said framework are in place on said cushion.

* * * * *